United States Patent [19]

Westover et al.

[11] 4,187,771
[45] Feb. 12, 1980

[54] FRYING APPARATUS

[75] Inventors: Jack D. Westover, Burnsville; Richard L. Keller, Minneapolis, both of Minn.

[73] Assignee: The Pillsbury Company, Minneapolis, Minn.

[21] Appl. No.: 846,963

[22] Filed: Oct. 31, 1977

[51] Int. Cl.² .............................................. A47J 37/12
[52] U.S. Cl. ..................................... 99/404; 99/427; 99/443 C
[58] Field of Search ........................ 99/404, 405–407, 99/352, 353, 354, 355, 360, 423, 426, 427, 443 C; 141/83, 129, 180; 198/493

[56] References Cited

U.S. PATENT DOCUMENTS

| | | | |
|---|---|---|---|
| 1,808,215 | 6/1931 | Friedel | 99/406 |
| 1,919,185 | 7/1933 | Chapman | 99/404 |
| 2,709,955 | 6/1955 | Hunter | 99/404 |
| 2,940,458 | 6/1960 | Speckman | 99/443 C X |
| 3,132,949 | 5/1964 | Crowe | 99/404 X |
| 3,331,375 | 7/1967 | Hickey et al. | 99/404 X |
| 3,472,155 | 10/1969 | Cardis et al. | 99/404 |
| 3,585,923 | 6/1971 | Waller | 99/404 X |
| 3,635,149 | 1/1972 | Smith et al. | 99/404 |
| 3,641,924 | 2/1972 | Sijbring | 99/406 |
| 3,861,289 | 1/1975 | Baker et al. | 99/404 |

*Primary Examiner*—George F. Mautz
*Assistant Examiner*—Arthur O. Henderson
*Attorney, Agent, or Firm*—Robert J. Lewis; Michael D. Ellwein; Mart C. Matthews

[57] ABSTRACT

A frying apparatus for food products is described which includes a fat holding tank, a transfer conveyor within the tank extending from one end to the other for transporting food products through the tank and a drive motor for the conveyor. The conveyor is preferably provided with upwardly extending, downwardly opening recesses to engage the top of the food products within the fat. The food products extend up into these recesses so that the engagement of the food products with the recesses is adapted to prevent slippage between the food and the conveyor. The invention also includes a provision for elevating and advancing incoming products within the fat to thereby transport them toward the outlet until securely engaged by the conveyor.

6 Claims, 8 Drawing Figures

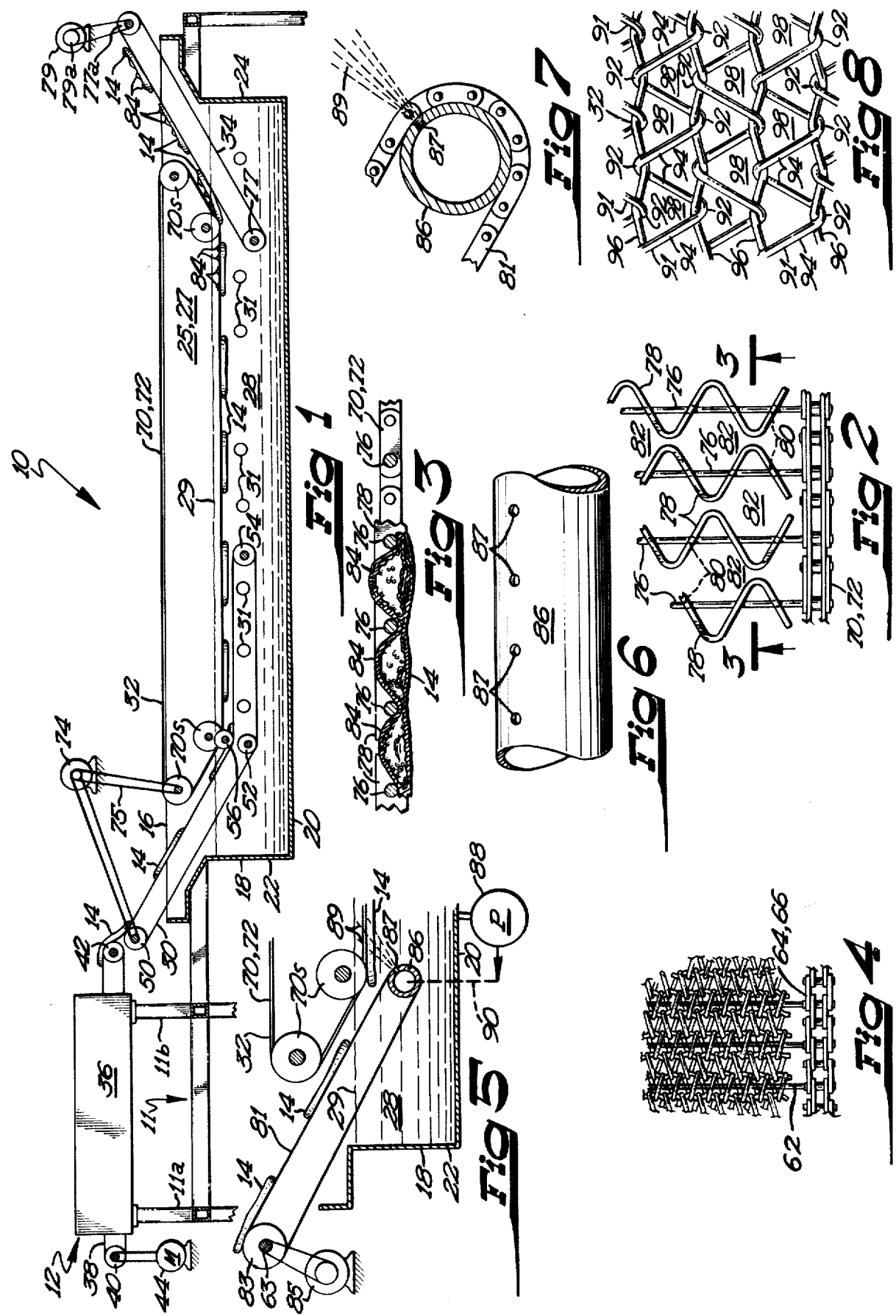

FRYING APPARATUS

FIELD OF THE INVENTION

The invention relates to food processing equipment and more particularly to fat fryers suited for frying large, delicate objects.

THE PRIOR ART

One important use for the present invention is the preparation of fried dough products such as fried pizza shells and the like. Accordingly, the invention will be described by way of example in connection with pizza shell production and particularly in connection with the manufacture of complete pizzas suited for distribution in a refrigerated or frozen condition. The invention can, however, also be used for preparing other fat or oil fried foods such as donuts, long johns, bismarks, and other pastry as well as fried meat or vegetable products.

Certain fried dough products, such as fried pizza shells, because of their relatively large size are easily damaged during frying. For example, if a pizza shell is touched by machine parts at the wrong time or jarred, it can be deformed or torn. Moreover, at some operating speeds, the forward motion of the conveyor will create enough oil resistance to bend some of the pizzas causing them to fold near the center. When this happens, the leading edge of the pizza shell will be folded downwardly onto itself. Even if it does not stick together, the folded dough shell will be ruined and must be discarded.

Prior fat fryers have several shortcomings, the most important is the inability to convey delicate, easily damaged pieces which may be 10–14" in diameter through heated frying fat at speeds of approximately 30–40 feet per minute or more without damaging them. In addition, available fryers have no reliable provision for securely engaging the food product and transporting it through the fat. Another shortcoming of many available fryers is the lack of a reliable provision for transferring delicate objects into the fat and removing them after they have been fried without in some way damaging them.

OBJECTS

The major object of the invention is to provide an improved conveyorized fryer of the type adapted to carry food products through a tank of heated frying fat in a controlled time interval with the following characteristics and advantages: (a) provision for conveying delicate foods into and out of the frying fat without damaging them, (b) the provision of a means on a conveyor for securely and reliably engaging each food product, (c) a reliable provision for preventing large, flat or delicate food products from becoming folded over as they are carried through the fryer, (d) provision for handling and conveying delicate, soft dough products from an inlet to the outlet of a fryer at speeds of 30–40 feet per minute or more without damaging them, (e) provision for assisting in the transfer of food products from inlet of the apparatus to a transfer conveyor by both mechanical and fluid transfer means for elevating and advancing the food, and (f) the provision of a downwardly opening and upwardly extending recesses in the conveyor for engaging food products and carrying them through the fat from the inlet toward the outlet.

In the accomplishment of the foregoing and related advantages and objectives, the invention then comprises the features hereinafter fully described and particularly pointed out in the claims, the following description setting forth in detail certain illustrative embodiments of the invention by way of example, these being indicative, however, of but a few of the various ways in which the principles of the invention may be employed.

THE FIGURES

FIG. 1 is a semidiagramatic side elevational view of a fryer in accordance with one form of the invention.

FIG. 2 is a partial plan view of the main food product transfer conveyor of FIG. 1 on a larger scale.

FIG. 3 is a vertical cross-sectional view taken on line 3—3 of FIG. 2.

FIG. 4 is a partial view of conveyor 30.

FIG. 5 is a partial vertical sectional view of another form of the invention on a slightly larger scale.

FIG. 6 is a partial front elevational view of the feed conveyor supporting member.

FIG. 7 is a cross-sectional view of the lower end of the feed conveyor of FIG. 5 on a larger scale.

FIG. 8 is a partial plan view of another form of main food product transfer conveyor.

SUMMARY OF THE INVLNTION

A frying apparatus for food products is described which includes a fat holding tank having side and bottom walls. A transfer conveyor within the tank extends from one end to the other for conveying food products from an inlet end of the tank to an outlet at the other end. A drive means is connected to the conveyor. The conveyor includes a plurality of product engaging members such as wires or sheet metal members or the like with openings or recesses between them that receive parts of the food product. In one preferred form of the invention, the conveyor is provided with upwardly extending, downwardly opening recesses or openings to engage the top of food products within the fat. The openings are sufficiently large so that the product expands or bulges up into the openings during cooking. In this way portions of the food products project up into the openings. The engagement of the food products in the openings is adapted to prevent slippage between the food and the conveyor. Another aspect of the invention is the provision of a means to both elevate and advance the incoming product at a time when it is likely to sink and to transport it toward the outlet until securely engaged by the transfer conveyor.

DETAILED DESCRIPTION OF THE INVENTION

In FIG. 1 is shown by way of example a fryer indicated generally by numeral 10 that includes a framework 11 having, for yeast leavened dough processing, posts 11a and 11b supporting a proofer 12 which contains warm, moist air. Extending through the proofer 12 is a conveyor 38 for moving products such as flat dough pieces or sheets 14 which can be used for making pizzas into a fryer indicated generally at 16.

While many fat fryers can be adapted by changes in construction for incorporation of the features that characterize the present invention, the fryer 16 which is illustrated by way of example includes a frying vessel 18 having a flat bottom wall 20, front and rear walls 22 and 24 and side walls 25 and 27 and is filled with frying fat 28, e.g., soy oil, to a predetermined level 29. The tank includes a plurality of horizontally disposed tubes 31 each of which contains a heater such as a gas burner for heating the fat to frying temperature. Within the frying vessel 18, is an inclined feed conveyor 30 and a transfer conveyor 32, for transferring the product from the inlet end of the tank 18 at the left to the outlet at the right and an outfeed to conveyor 34 is provided for carrying finished fried product out of the apparatus after they have cleared the right end of transfer conveyor 32.

The proofer will now be described is somewhat more detail with reference to FIG. 1. As seen in the figure, the proofer 12 includes a housing 36 having side, top and bottom walls to provide a housing which in operation contains warm, moist air for proofing the bakery goods 14. The belt conveyor 38 is entrained over rolls 40 and 42 and is driven by means of a suitable drive motor 44. Thus, as the proofed product 14 leaves the proofing cabinet 36, it passes over the end of roll 42 onto the feed conveyor 30.

The feed conveyor 30 comprises three longitudinally spaced sets of laterally separated sprocket pairs 50, 52 and 54, each pair being mounted for rotation on the same axle. The latter two pairs are at the same elevation. The sprocket pair 50 is elevated above the top of the fryer 16. An additional set of laterally spaced sprockets 56 are provided a short distance above sprockets 52 to engage the top of conveyor 30 near its center for the purpose of holding down the upper run of the conveyor and thereby provide a downwardly inclined feed section between sprockets 50 and 56 and a horizontal feed conveyor section between the sprockets 52, 54 and 56. Thus, the product 14, as it falls from conveyor 38 onto the upper portion of conveyor 30 is carried downwardly at an inclined angle into the heated fat 28 and beneath the transfer conveyor 32. It will be seen that the horizontal section of the feed conveyor between sprockets 52–56 and 54 extends under a portion of transfer conveyor 32 and generally parallel to it. It is spaced from it by a sufficient distance to provide room for the food products, e.g., about an inch or two. In this way the product 14 even though very delicate in structure will be adequately supported by conveyor 30 beneath the conveyor 32 during the initial exposure of the food to the hot fat 28. In addition, the conveyor can be run at fairly high speeds without the dough pieces 14 becoming folded over due to the frictional drag of the heated fat owing to the close proximity of the horizontal section of conveyor 30 and conveyor 32 above it. Thus, the conveyor 30 serves both to elevate and advance the food products 14 prior to the time that they engage conveyor 32 or during their initial contact with the conveyor 32. After a certain amount of frying takes place, the expansion of moisture and gas within the food products usually causes them to rise into engagement with the conveyor 32. As soon as this happens, the lifting and advancing function of conveyor 30 is no longer needed. The conveyor 30 can extend toward the right as far as desired and can indeed extend its full length if advantageous.

The feed conveyor itself is best seen in FIG. 4. As shown in the figures, the conveyor belt is composed of a mesh of any suitable known mesh construction such as a woven wire mesh entrained about laterally extending metal rods 62, the ends of which are fastened to roller chains 64 and 66.

The main transfer conveyor 32 will now be described. As seen in FIG. 1, the transfer or hold-down conveyor 32 includes a pair of parallel endless roller chains 70–72, one on each side thereof entrained over four pair of laterally spaced sprockets 70s, only the ones closest to the observer being shown, each journaled for rotation above the tank 18 in suitable bearings mounted upon the apparatus. The lower run of the conveyor 32 is positioned slightly below the surface 29 of the frying fat in a preferred operating mode of the invention. The sprockets 70s support the chains during operation and are driven by a drive motor 74 connected via chain sprocket assembly 75 to the sprockets 70s. It will be noticed that the two sprockets 70s at the left hand or inlet end of the transfer conveyor 32 are positioned so that the upper set 70s is located further toward the inlet, i.e., toward the left than the lower set 70s. As a result, the lower end of the inlet conveyor 30 extends beneath the inlet end of the transfer conveyor 32 both in the embodiments of FIG. 1 and the embodiment of FIGS. 5, 6 and 7. Consequently, the food product 14 which initially is too heavy to float, after being heated expands and floats upwardly into contact with the transfer conveyor 32.

Extending between the roller chains 70 and 72 are rods 76 and mounted upon the rods 76 in turn are sheet metal strips 78 bent into serpentine or zig zag form and having holes 80 bores in them so that they can be slid bodily over the rods 76 to thereby define recesses 82 between them and it is into the vertically extending downwardly opening recesses 82 between the sheet metal strips 78 that portions 84 of the food product 14 extend thereby securely engaging the food product 14 with the conveyor 32. The lower run of the conveyor 32 is in proximity with the frying fat, that is to say, slightly above the surface, at the surface or beneath the surface. In proximity with the frying fat means that the lower run of the conveyor 32 is at least close enough to the fat to engage the product.

Refer now to FIG. 5 which illustrates a modified form of the invention wherein corresponding numbers refer to the same parts as in FIG. 1–3. A feed conveyor 81 is provided having an upper set of laterally spaced sprockets 83 (only one of which is shown) mounted on opposite ends of the drive shaft 63 supported for rotation above the tank 18 and driven when in operation by means of a suitable drive motor 85. The lower end of the conveyor 81 is entrained over a pipe 86 which serves as a lower sprocket. The pipe is stationary. The conveyor simply slides on the surface of the pipe. To this end the pipe should have a polished abrasion resistant surface. The pipe 86 is provided with longitudinally distributed openings 87 which in this case are bored openings located in the upper right hand portion of the pipe as seen in FIG. 5. A pump 88 is connected to pipe 86 to direct streams of heated fat 89 out through openings 87. The frying fat entering pump 88 is pumped from the tank 18 by the pump 88 through a pipe 90 into the pipe 86 and out through the openings 87. As can be seen in FIG. 5, the streams 89 extend upwardly and toward the right, i.e., centrally toward the outlet end of the tank and as such, has a component of motion in the direction of travel taken by the food products 14, that is to say, from left to right in the figures. Thus, it can be seen that the streams of fluid 89 both lifts the food products and carries them toward the right, thus assisting the conveyor 32 and transferring the food at least initially through the fat. In addition the stream or jets 89 help to prevent the leading edge of the food products 14 from being folded downwardly at high operating speeds. The conveyor 30 and the streams 89 can be thought of as a means for lifting and advancing the food products within the frying fat before reaching the transfer conveyor 32 and during the initial contact with the transfer conveyor 32. It should be understood that after the gas and vapor expands in the food products 14, the function of the jet 88 is unnecessary since the product will then rise and come into contact with the conveyor 32.

When the products 14 reach the right or outlet end of the transfer conveyor 32, they are carried upwardly and out of the tank by takeaway conveyor 34 entrained over sprocket sets 77 and 77a and driven in any suitable manner as by means of a chain sprocket and geared by means of a drive motor 79 and chain and sprocket assembly 79a.

Refer now to FIG. 8 which illustrates the modified form of transfer conveyor 32. The chains 70 and 72 are the same, however the body of the conveyor has a different construction. In this instance, the transfer conveyor comprises a plurality of flexible wires 91 having spaced apart bends 92 between which are relatively straight segments 94. Connected between the bends are laterally extending flexible wires 96 that are connected at their ends to the roller chains 70 and 72. These wires form a mesh with openings 98 between them into which portions of the food product 14 extend during operation. The size of the openings 98 (or 82 in the FIGS. 2 and 3) is critical for each kind of bread, pastry roll, pizza shell or other farinaceous food that is being fried at the time. The openings can be thought of as expansion pockets and they must be large enough across for the dough to bulge or expand into the openings during frying so that the side surfaces of the expanded dough blister contact the sides of the product engaging members 78 or 91 which define the expansion pockets. Merely making a shallow pattern or impression of a woven wire screen on the top of a product is not enough; the openings must be of sufficient size so that the blisters develop side walls. To do this, the openings 82 or 98 should be at least about one inch across. This not only makes possible positive conveying but also provides an excellent product surface configuration.

The screen, i.e., conveyor mesh, of FIG. 8 can be specially constructed or if desired, can comprise commercially available conveyor screen. In one typical application in which the apparatus is used for producing pizza shells the openings 98 are about 1¼" on the side. The screen is resistant to damage but if it is damaged, there is very little chance of product contamination. The wire mesh of FIG. 8 is preferred to the screen of FIGS. 2 and 3. In addition, the finished food product 14 appears relatively non-uniform in cross-section and expands easily during frying into the openings 98.

What is claimed is:

1. A food fryer for cooking a flat farinaceous dough food product comprising a frying vessel having an inlet end and an outlet end and being adapted for holding fat, a heater for the fat in the vessel, an inlet conveyor having an upper run portion inclined downwardly into the vessel from the inlet end, a hold-down conveyor having a feed end adjacent the inlet end with the hold-down conveyor extending generally horizontally from one end of the vessel to the other, drive means connected to the hold-down conveyor for advancing the conveyor, said hold-down conveyor having an endless conveyor element including upper and lower runs, the lower run being located in close enough proximity with the frying fat to engage the product to be fried, said hold-down conveyor further including a generally planar intermediate run between a pair of conveyor supports, at the feed end and extending between the upper run and lower run at an incline and spaced from and generally parallel to the inlet conveyor upper run portion, an upper end portion of the intermediate run being positioned above the surface of the fat, said product being bouyed by said fat into contact with said lower run, said hold-down conveyor comprising an open wire mesh defining a plurality of openings therein, said mesh being disposed in a generally flat horizontal plane along said lower run and said openings being operable to allow portions of the top surface of food product bouyed by said fat into contact with said wire mesh expand upwardly into said openings during frying to form on said surface a corresponding plurality of upwardly projecting blisters having side walls which engage the wires of the mesh and prevent slippage between the food product and the conveyor.

2. The apparatus of claim 1 including an outlet conveyor for carrying the product out of the frying fat adjacent an outlet end of the hold-down conveyor.

3. The apparatus of claim 2 wherein a fluid jet is directed along a diagonal extending upwardly and forwardly in the direction of the outlet end of the hold-down conveyor to thereby both support the food product initially when located beneath the inlet end of the hold-down conveyor and advance the food products in the direction of the outlet end of the hold-down conveyor.

4. The apparatus of claim 3 wherein the inlet conveyor comprises a downwardly and centrally extending inclined belt conveyor entrained over a hollow tube at the lower end thereof and means is provided for expelling fat upwardly and centrally from the hollow tube to elevate and advance the food products.

5. The apparatus of claim 2 wherein the inlet conveyor has a generally horizontal portion located beneath the lower run of the hold-down conveyor adjacent the feed end whereby the food product is initially supported in the fat by the inlet conveyor and after being in contact with the hot fat becomes heated and expands thereby floating upardly in the frying fat into engagement with the lower run of the hold-down conveyor.

6. The apparatus of claim 1 wherein said openings in said mesh are at least one inch across.

* * * * *